United States Patent
Hearty et al.

(12)

(10) Patent No.: US 11,736,505 B2
(45) Date of Patent: Aug. 22, 2023

(54) AUTOMATED WEB TRAFFIC ANOMALY DETECTION

(71) Applicant: MASTERCARD TECHNOLOGIES CANADA ULC, Vancouver (CA)

(72) Inventors: John Hearty, Vancouver (CA); Jake Madison, Vancouver (CA); Zhi-Ping Ng, New Westminister (CA); Nicholas Desmond, Port Moody (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 365 days.

(21) Appl. No.: 17/168,364

(22) Filed: Feb. 5, 2021

(65) Prior Publication Data

US 2021/0250368 A1    Aug. 12, 2021

Related U.S. Application Data

(60) Provisional application No. 62/971,352, filed on Feb. 7, 2020.

(51) Int. Cl.
*H04L 9/40* (2022.01)

(52) U.S. Cl.
CPC ...... *H04L 63/1425* (2013.01); *H04L 63/1416* (2013.01); *H04L 63/1466* (2013.01); *H04L 63/20* (2013.01)

(58) Field of Classification Search
CPC ............. H04L 63/1425; H04L 63/1416; H04L 63/1466; H04L 63/20; H04L 2463/121
See application file for complete search history.

(56) References Cited

U.S. PATENT DOCUMENTS

| | | | |
|---|---|---|---|
| 9,112,895 B1* | 8/2015 | Lin | H04L 63/1425 |
| 9,712,549 B2* | 7/2017 | Almurayh | H04L 63/1425 |
| 10,129,118 B1* | 11/2018 | Ghare | H04L 43/028 |
| 10,673,880 B1* | 6/2020 | Pratt | G06F 21/554 |
| 2008/0295172 A1* | 11/2008 | Bohacek | H04L 63/1416 726/23 |
| 2016/0308733 A1* | 10/2016 | Chauhan | H04L 67/75 |
| 2016/0330219 A1 | 11/2016 | Hasan | |
| 2017/0070521 A1 | 3/2017 | Bailey et al. | |

(Continued)

OTHER PUBLICATIONS

International Search Report and Written Opinion for Application No. PCT/CA2021/050128 dated May 10, 2021 (9 pages).

*Primary Examiner* — Farid Homayounmehr
*Assistant Examiner* — Mudasiru K Olaegbe
(74) *Attorney, Agent, or Firm* — Michael Best & Friedrich LLP

(57) ABSTRACT

An anomaly detection system that includes a database and a server. The server is connected to the database. The server is configured to identify anomalous web traffic for a certain time period based on one or more client keys from the certain time period. The client key(s) includes at least two characteristics related to web traffic data. The server includes a processing unit and a memory. The server is configured to receive the web traffic data from the database, calculate a z-score metric for the client key, calculate a change rate metric for the client key, calculate a failure metric for the client key, determine an anomaly score based on the z-score metric, the change rate metric, and the failure metric, and determine that the certain time period is an anomalous time period based on the anomaly score.

20 Claims, 6 Drawing Sheets

(56) References Cited

U.S. PATENT DOCUMENTS

2018/0219879 A1\* 8/2018 Pierce ................. H04L 63/1416
2019/0065302 A1\* 2/2019 Cosgrove ............ G06F 11/0754
2019/0102545 A1 4/2019 Wang et al.

\* cited by examiner

AUTOMATED WEB TRAFFIC ANOMALY DETECTION

RELATED APPLICATIONS

This application claims the benefit of U.S. Provisional Patent Application No. 62/971,352, filed Feb. 7, 2020, the entire content of which is hereby incorporated by reference.

FIELD

Embodiments described herein relate to the detection of anomalies in web traffic.

BACKGROUND

Detecting anomalies in web traffic data is an increasingly difficult task as potential attacks on websites become more sophisticated and traffic to particular websites increases. Conventionally, detecting anomalies in web traffic is performed by highly-skilled human analysts. However, even highly-skilled human analysts are only capable of comparatively superficial web traffic anomaly detection. For example, web traffic can be considered in terms of levels of granularity. While a human analyst may be able to consider a set of web traffic data (e.g., for a particular client) with respect to a first characteristic (e.g., country of origin), the analyst is unable to effectively and comprehensively evaluate the web traffic data at lower levels of granularity. As a result of these limitations, anomaly detection accuracy is low and reports of anomalous web traffic could be both incomplete and time consuming to generate.

SUMMARY

In some embodiments, automating web traffic anomaly detection using one or more client keys permit both more accurate and efficient web traffic anomaly detection, as well as more efficient and complete reporting of such detection. Client keys include one or more characteristics related to the client's web traffic data (e.g., country of origin, webpage, etc.) that are used to segment the client's web traffic data. Anomaly metrics for each client key segment of the web traffic data can then be determined and used to identify web traffic anomalies. The greater the number of characteristics that are included in each client key, the lower the level of granularity with which anomaly detection can be performed. Client keys enable the analysis of the web traffic data more completely than a human analyst, faster than a human analyst, and at a substantially greater level of granularity than a human analyst. As a result, the use of the client key can produce a more robust anomaly detection than conventional techniques.

Embodiments described herein provide systems, methods, and computer readable media related to the detection of anomalies in web traffic. The anomaly detection system includes a database and a server. The server is connected to the database. The server is configured to identify anomalous web traffic based on a client key. The client key includes at least two characteristics related to web traffic data. The server includes a processing unit and a memory. The server is configured to receive the web traffic data from the database, calculate a z-score metric for the client key, calculate a change rate metric for the client key, calculate a failure metric for the client key, and detect a web traffic anomaly based on the z-score metric, the change rate metric, and the failure metric.

One embodiment provides an anomaly detection system that may include a database, and a server connected to the database. The server may be configured to identify anomalous web traffic of a client key from a first time period. The server may include a processing unit and a memory. The server may be configured to receive the web traffic data from the database. The server may be further configured to calculate, using the processing unit, a z-score metric for the client key. The z-score metric may indicate a deviation of at least one value of a first attribute of the client key with respect to other values of the first attribute (i) of the client key from other time periods or (ii) of other client keys. The server may be further configured to calculate, using the processing unit, a change rate metric for the client key based on the at least one value of the first attribute from the first time period compared to another value of the first attribute of the client key from another time period. The server may be further configured to calculate, using the processing unit, a failure metric for the client key. The server may be further configured to determine that the first time period is an anomalous time period based on the z-score metric, the change rate metric, and the failure metric.

Another embodiment provides a method of detecting an anomaly in web traffic data. The method may include receiving, with a server and from a database, the web traffic data of a client key from a first time period. The method may further include calculating, using the processing unit of the server, a z-score metric for the client key. The z-score metric may indicate a deviation of at least one value of a first attribute of the client key with respect to other values of the first attribute (i) of the client key from other time periods or (ii) of other client keys. The method may further include calculating, using the processing unit, a change rate metric for the client key based on the at least one value of the first attribute from the first time period compared to another value of the first attribute of the client key from another time period. The method may further include calculating, using the processing unit, a failure metric for the client key. The method may further include determining, using the processing unit, that the first time period is an anomalous time period based on the z-score metric, the change rate metric, and the failure metric.

Another embodiment provides an anomaly detection system that may include a database configured to store web traffic data, and a server connected to the database. The server may include a processing unit and a memory. The server may be configured to receive the web traffic data from the database. The server may be further configured to evaluate the web traffic data using a plurality of attribute combinations. Each attribute combination may include a plurality of attributes each with a corresponding value, and each attribute combination may include a unique combination of values when compared to the other attribute combinations of the plurality of attribute combinations. The server may be further configured to determine that the web traffic data corresponding to at least one of the plurality of attribute combinations includes a fail count greater than or equal to a fail count threshold. The server may be further configured to create an attribute key including the values of the at least one of the plurality of attribute combinations. The server may be further configured to identify an attack signature using the attribute key.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Figure 1:
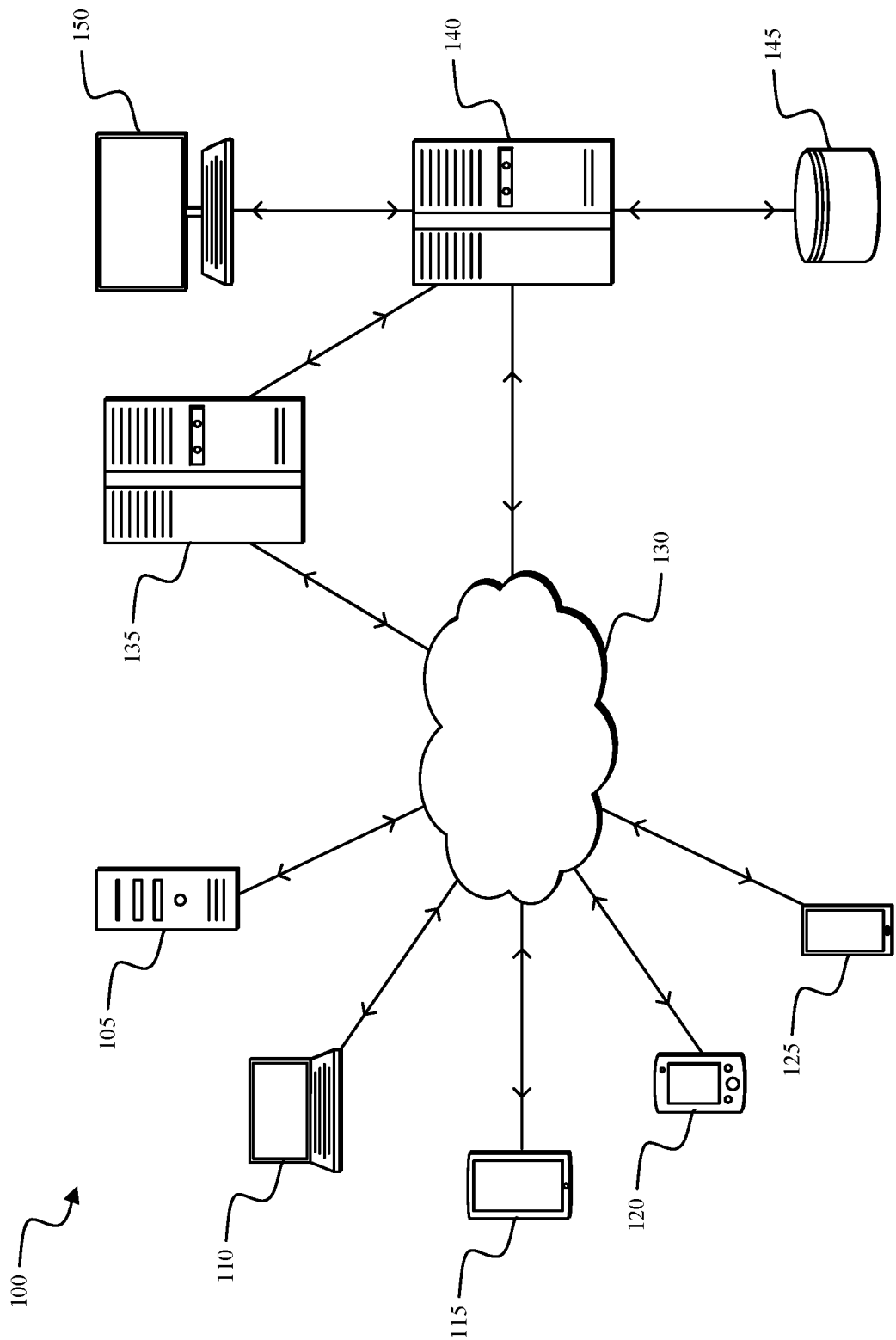
FIG. 1 illustrates a system for detecting web traffic anomalies, according to embodiments described herein.

FIG. 1 illustrates a system 100 for detecting web traffic anomalies. In some embodiments, the system 100 includes a plurality of client-side devices 105-125, a network 130, a first server-side mainframe computer or server 135, a second server-side mainframe computer or server 140, a database 145, and a server-side user interface 150 (e.g., a workstation). The plurality of client-side devices 105-125 include, for example, a personal, desktop computer 105, a laptop computer 110, a tablet computer 115, a personal digital assistant ("PDA") (e.g., an iPod touch, an e-reader, etc.) 120, and a mobile phone (e.g., a smart phone) 125. Each of the devices 105-125 may be configured to communicatively connect to the server 135 or the server 140 through the network 130 and provide information to the server 135 or server 140 related to, for example, a requested webpage. Each of the devices 105-125 can request a webpage associated with a particular domain name, can attempt to login to an online service, etc. The data sent to and received by visitors of a website will be generally referred to herein as client web traffic data. In the system 100 of FIG. 1, the server 135 represents a client server that is hosting a client website. Client web traffic data is produced as the devices 105-125 request access to webpages hosted by the server 135. The server 140 is connected to the server 135 and is configured to log and analyze the client web traffic data for the server 135. In some embodiments, the server 140 both hosts the client website and is configured to log and analyze the client web traffic data associated with the client website. The server 140 may be configured to store the logged client web traffic data in the database 145 for future retrieval and analysis. The workstation 150 can be used, for example, by an analyst to manually review and assess the logged client web traffic data. The logged client web traffic data includes a variety of attributes related to the devices interacting with the client website. For example, the attributes of the devices 105-125 include, among other things, user agent, operating system, browser, device ID, number of clicks, account ID, country of origin, time of day, etc. Attribute information received from the devices 105-125 at the server 135 can also be stored in the database 145.

The network 130 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 130 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio network, a Digital Enhanced Cordless Telecommunications ("DECT") network, a Digital AMPS ("IS-136/TDMA") network, or an Integrated Digital Enhanced Network ("iDEN") network, etc. The connections between the devices 105-125 and the network 130 are, for example, wired connections, wireless connections, or a combination of wireless and wired connections. Similarly, the connections between the servers 135, 140 and the network 130 are wired connections, wireless connections, or a combination of wireless and wired connections.

Figure 2:
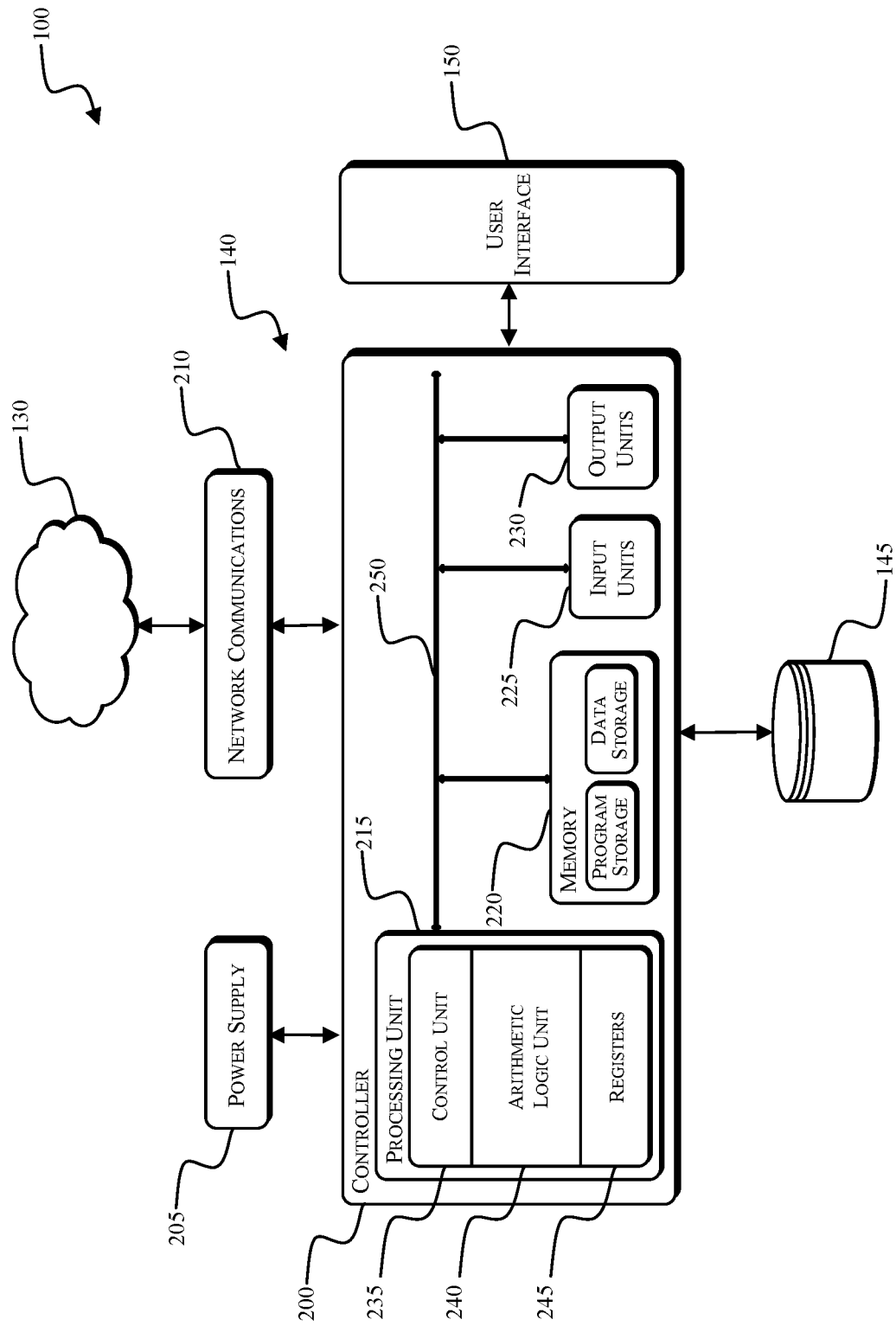
FIG. 2 illustrates a server-side processing device of the system of FIG. 1, according to embodiments described herein.

FIG. 2 illustrates the server-side of the system 100 with respect to the server 140 according to one example embodiment. The server 140 may be electrically and/or communicatively connected to a variety of modules or components of the system 100. For example, the server 140 is connected to the database 145 and the user interface 150. The server 140 may include a controller 200, a power supply module 205, and a network communications module 210. The controller 200 may include combinations of hardware and software that are operable to, for example, analyze client web traffic data to detect anomalies, determine an attack signature based on detected anomalies, etc. The controller 200 may include a plurality of electrical and electronic components that provide power and operational control to the components and modules within the controller 200 and/or the system 100. For example, the controller 200 includes, among other things, a processing unit 215 (e.g., a microprocessor, a microcontroller, or another suitable programmable device), a memory 220, input units 225, and output units 230. The processing unit 215 may include, among other things, a control unit 235, an arithmetic logic unit ("ALU") 240, and a plurality of registers 245 (shown is a group of registers in FIG. 2) and may be implemented using a known architecture. The processing unit 215, the memory 220, the input units 225, and the output units 230, as well as the various modules connected to the controller 200 may be connected by one or more control and/or data buses (e.g., common bus 250). The control and/or data buses are shown schematically in FIG. 2 for illustrative purposes.

The memory 220 may be a non-transitory computer readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The processing unit 215 may be connected to the memory 220 and may execute software instructions that are capable of being stored in a RAM of the memory 220 (e.g., during execution), a ROM of the memory 220 (e.g., on a generally permanent basis), or another non-transitory computer readable data storage medium such as another memory or a disc.

In some embodiments, the controller 200 or network communications module 210 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. In some embodiments, the network communications module 210 includes an application programming interface ("API") for the server 140. Software included in the implementation of the system 100 can be stored in the memory 220 of the controller 200. The software includes, for example, firmware, one or more applications, program data, filters, rules, one or more program modules, and other executable instructions. The controller 200 may be configured to retrieve from memory and execute, among other things, instructions related to the control methods and processes describe herein.

The power supply module 205 may supply a nominal AC or DC voltage to the controller 200 or other components or modules of the system 100. The power supply module 205 may be powered by, for example, mains power having nominal line voltages between 100V and 240V AC and frequencies of approximately 50-60 Hz. The power supply module 205 may also be configured to supply lower voltages to operate circuits and components within the controller 200 or system 100.

The user interface 150 may include a combination of digital and analog input or output devices required to achieve a desired level of control and monitoring for the system 100. For example, the user interface 150 includes a display (e.g., a primary display, a secondary display, etc.) and input devices such as a mouse, touch-screen displays, a plurality of knobs, dials, switches, buttons, etc.

Figure 3:
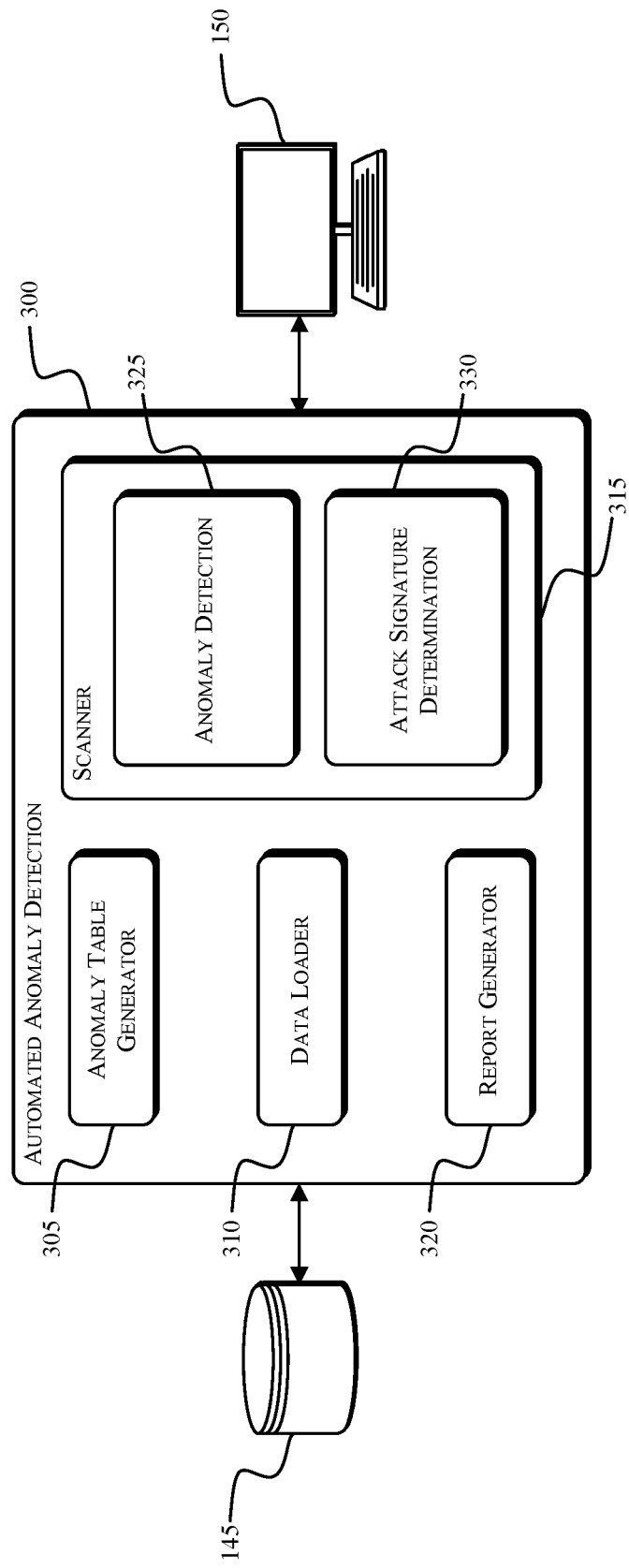
FIG. 3 illustrates an automated anomaly detection control unit, according to embodiments described herein.

The memory 220 of the controller 200 can include various modules and submodules related to implementing web traffic anomaly detection and attack signature determination. For example, FIG. 3 illustrates an automated anomaly detection control unit or module 300 that can be included in the memory 220. The automated anomaly detection module 300 is operatively connected, for example, to the database 145 and the workstation 150. The automated anomaly detection module 300 may be configured to, among other things, access client web traffic data related to a client from the database 145, analyze the data, and provide results of the analysis to the workstation 150.

The automated anomaly detection module 300 can include an anomaly table generator module 305, a data loader module 310, a scanner module 315, and a report generator module 320. The scanner module 315 may include an anomaly detection module 325 and an attack signature determination module 330. The anomaly detection module 325 and the attack signature determination module 330 may include the executable instructions for scanning web traffic data, detecting anomalies, and identifying attack signatures. The anomaly table generator module 305 and the data loader module 310 may primarily be used to retrieve data from the database 145 and ensure that the configuration files required for automated anomaly detection have been generated. The report generator module 320 may provide the results of anomaly detection and attack signature determination to the workstation 150 for viewing and further analysis by a user. For example, reports may be used by an analyst to re-program an anomaly detection algorithm to more accurately detect future anomalies. As another example, reports may be provided to entities that host webpages to inform these entities of previous attempted attacks on their webpages.

Figure 4:
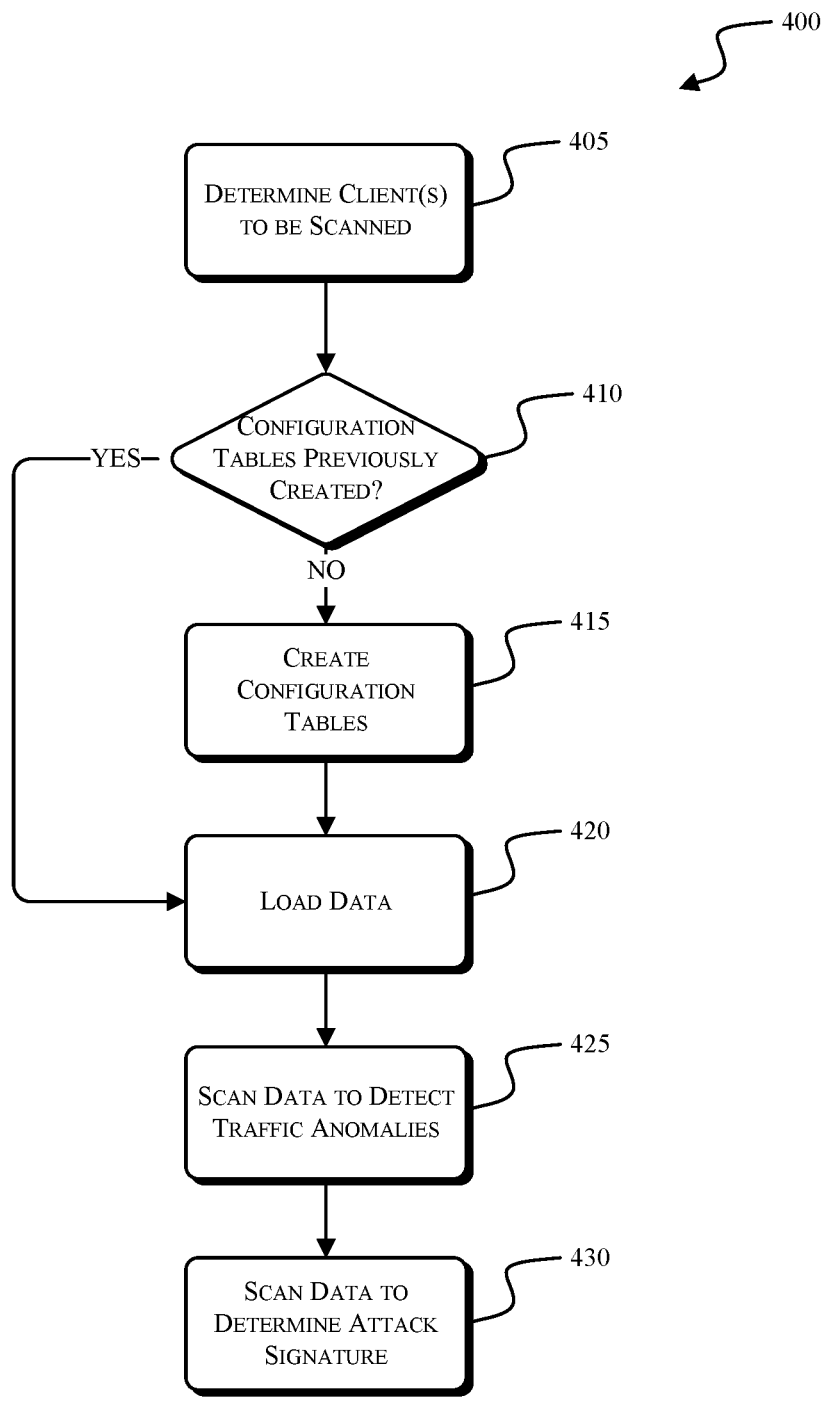
FIG. 4 is a process for web traffic anomaly detection and attack signature determination, according to embodiments described herein.
Figure 5:
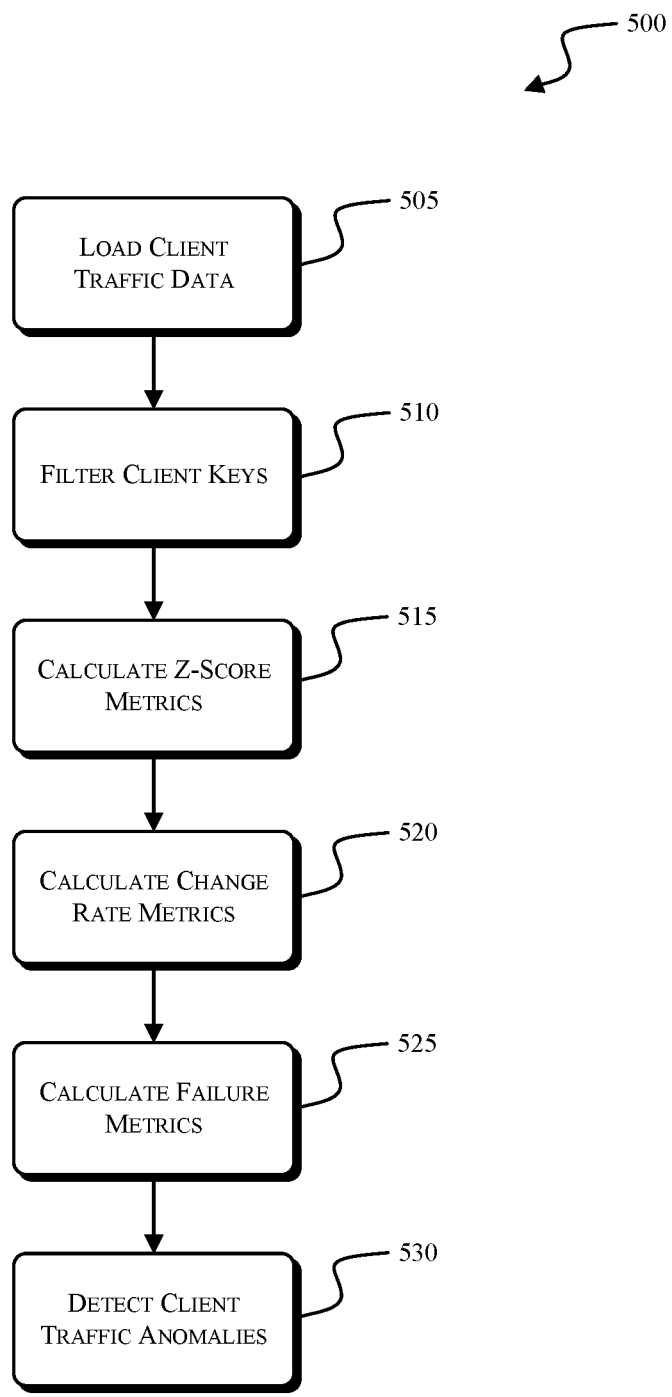
FIG. 5 is a process for web traffic anomaly detection, according to embodiments described herein.
Figure 6:
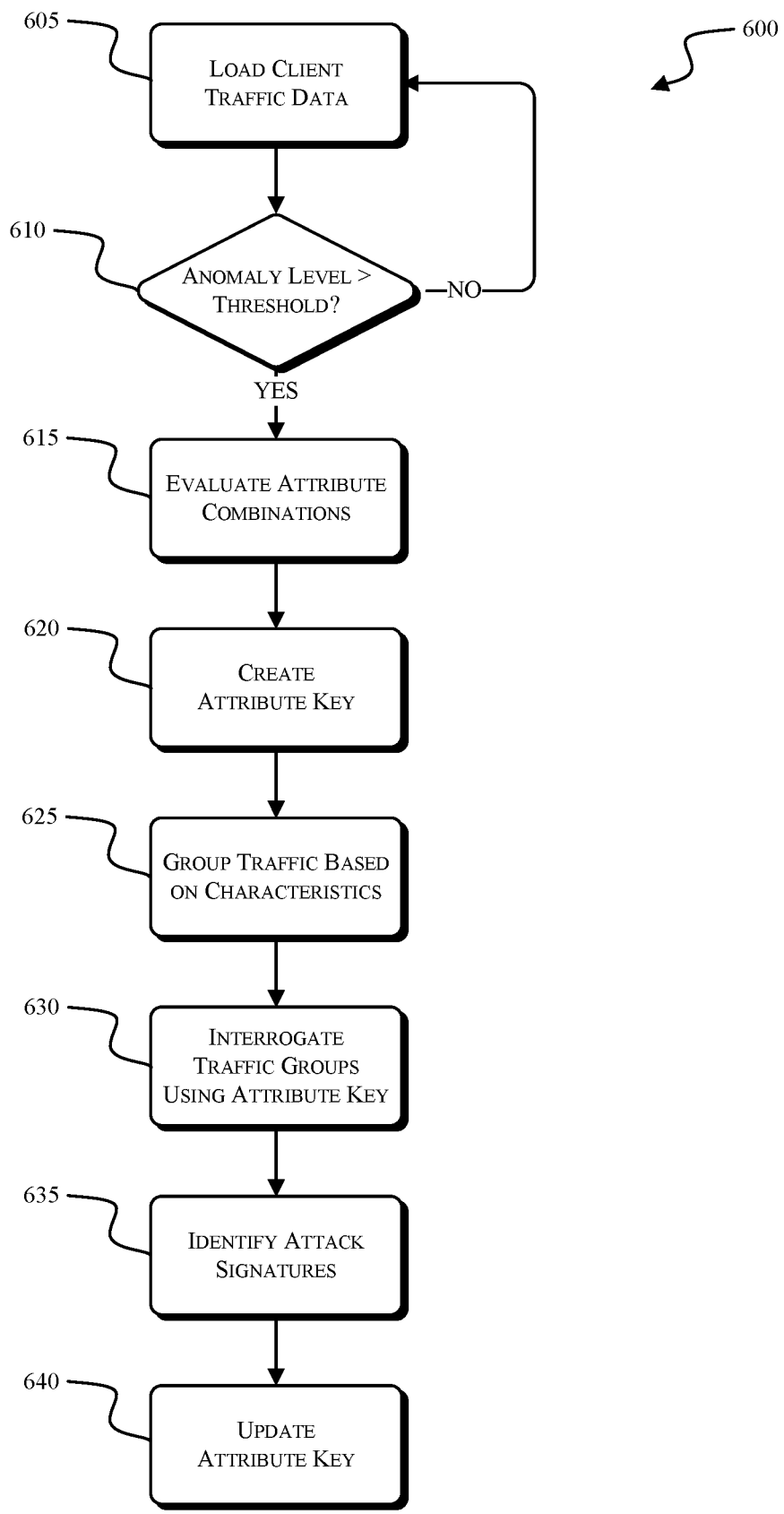
FIG. 6 is a process for attack signature determination, according to embodiments described herein.

The submodules within the automated anomaly detection module 300 will be described with respect to processes 400, 500, and 600 shown in and described with respect to FIGS. 4, 5, and 6, respectively. FIG. 4 illustrates a general process 400 for detecting web traffic anomalies and determining attack signatures. FIG. 5 illustrates a specific process 500 for performing web traffic anomaly detection. FIG. 6 illustrates a specific process 600 for determining an attack signature.

With reference to FIG. 4 and process 400, the controller 200 may identify outliers or anomalies in client web traffic over a certain time period and determine characteristics of the detected anomalies over the certain time period. The process 400 may begin with the controller 200 determining which client websites are going to be scanned for anomalous web traffic (STEP 405). In some embodiments, the controller 200 determines which client websites to scan based on a user input received by the workstation 150. In some embodiments, the database 145 maintains a table that indicates whether each client website for which web traffic is stored should be scanned for anomalies. In some embodiments, the table stored in the database 145 is user configurable based on user inputs received by the workstation 150. For illustrative purposes, the process 400 will be described with respect to one client website being scanned. In other embodiments, a plurality of client websites can be scanned simultaneously or sequentially by the controller 200. Following STEP 405, the controller 200 may determine whether various configuration tables used by the controller 200 for the client website have been created (STEP 410). If, at STEP 410, the configuration tables have not yet been created for the client website, the controller creates the configuration tables (STEP 415).

For example, the controller 200 can create four configuration tables that can be used to scan web traffic for anomalies. The tables include a website configuration table, a traffic volume summary table, a daily fraud report summary table, and a client event data table. The website configuration table may be used by the controller 200 to determine, for example, how to execute the anomaly scan (e.g., the granularity of the scan). In some embodiments, the granularity of the scan is a configurable value and can be set and modified for a given client website. The traffic volume summary table includes, for example, hourly anomaly counts (e.g., a number of anomalies in a certain time period) as well as anomaly metrics, such as calculated z-scores, change rates, failure rates, etc. The traffic volume summary table also includes, for example, a status indicator (e.g., regular, anomaly, warning, etc.) and an anomaly level assigned by the controller 200 (e.g., on a scale of 1-5) for a certain time period. The daily fraud report summary table may include a summary of the traffic volume summary results (e.g., anomalies detected) when a traffic anomaly was detected within a defined period (e.g., a 24-hour period). The client event data table may include client data that is optimized for query performance (e.g., scanning). In some embodiments, one or more values in one or more of the traffic volume summary table, the daily fraud report summary table, and the client event table are determined based on historical data of the client website.

After the configuration tables are generated at STEP 415, or if the configuration tables were previously generated at STEP 410, the controller 200 may load client web traffic data from the database 145 (STEP 420). In some embodiments, the client web traffic data has already been analyzed by a separate system and/or using a separate method that determines anomalies for each transaction/attempted transaction (i.e., on a per-event/transaction basis). After loading the client web traffic data, the controller 200 may scan the client web traffic data to detect traffic anomalies at a higher level, for example, to compare tendencies of many events/transactions over a certain time period to events/transactions over other time periods (STEP 425). For example, a process 500 may be performed at STEP 425 of FIG. 4 with respect to a certain time period (e.g., a time span such as an hour during a certain day) during which web traffic data is compared for anomalies to (i) other times of that same day, (ii) the same time of previous days, (iii) both (i) and (ii), or the like. In other words, the process 500 may detect anomalous time periods that may be indicative of a cyber-attack that may span multiple client-side devices 105-125, IP addresses, accounts, and/or the like. Thus, the process 500 may analyze client web traffic data at a macro level based on time periods that include numerous events/transactions after a different system and/or process has analyzed client web traffic data at a micro level on a per-event/transaction basis to identify anomalies associated with individual events/transactions. In some embodiments, the web traffic data analyzed by process 500 includes anomaly scores/ratings from the different system and/or process that analyzed each event/transaction individually (e.g., see the example z-score target metrics explained below with respect to FIG. 5). The scanning of the client web traffic data to detect traffic anomalies is described in greater detail with respect to FIG. 5 and the process 500.

After anomaly detection has been completed at STEP 425, the controller 200 may scan the client web traffic data from during the identified certain time period to determine an attack signature related to the detected anomalies (STEP 430). The scanning of the client web traffic data to determine an attack signature is described in greater detail with respect to FIG. 6 and the process 600. The process 400 can be performed, for example, for each of a client's webpages such that a comprehensive summary of traffic anomalies and attack signatures can be both reported to the client and used to protect the client's website from future, similar attacks.

Although the process 600 of FIG. 6 (e.g., at STEP 430) is described as being completed after the process 500 of FIG. 4 (e.g., at STEP 425), in some embodiments, the processes 500 and 600 may be executed independent of each other and/or in conjunction with other processes. For example, the process 600 may be executed by the server 140 without the process 500 being executed (e.g., when a user determines that a particular instance of the process 500 is not accurately and/or consistently identifying anomalous time periods due to poor tuning of one or more thresholds). However, execution of the process 500 may reduce an amount of web traffic data to be analyzed during execution of the process 600. For example, by performing pre-processing of the web traffic data during the process 500, the process 600 may only analyze the web traffic data generated during a time period determined to be anomalous (or highly anomalous) instead of a larger amount of web traffic data (e.g., all web traffic data or web traffic data from many different time periods).

FIG. 5 and the process 500 relate to the detection of web traffic anomalies (see, e.g., STEP 425 of FIG. 4). After the client web traffic data has been loaded (STEP 505), the controller 200 may filter the web traffic data to isolate portions of the web traffic data based on characteristics of the web traffic data (STEP 510). Each isolated portion of the web traffic data is referred to as a client key. The client keys can be processed by the controller 200 independently and in isolation from one another. In some embodiments, the characteristics of the web traffic data used to create the client keys overlap with one another. An example client key that includes multiple characteristics is shown below:

[company]+[webpage]+[device segment]

where webpage corresponds to the page on the client website that is being requested and device segment corresponds to a device type (e.g., iPhone, Android, etc.). In some embodiments, the only characteristic required to be included in a client key is the company (e.g., to specify a client domain). In other embodiments, as illustrated above, a client key includes multiple characteristics (e.g., two or more characteristics). The greater the number of characteristics that are included in each client key, the lower the level of granularity with which the controller 200 will perform anomaly detection for different time periods. The client keys enable the controller 200 to analyze the web traffic data more completely than a human analyst, faster than a human analyst, and at a substantially greater level of granularity than a human analyst. As a result, the controller 200 is capable of producing significantly more robust anomaly detection than conventional techniques.

For each of the client keys, the controller 200 may determine one or more metrics associated with the client key's corresponding web traffic data for different time periods. In some embodiments, the controller 200 determines z-score metrics (e.g., measure of standard deviations of certain values included in the current data for a time period with respect to the current data itself and/or with respect to historical data related to accessing the client website at similar time periods, days, dates, periods of the year, etc.), change rate metrics (e.g., positive or negative rate of change of certain values included in the current hourly data with respect to historical data related to accessing the client website in the previous hour or at similar previous times, days, dates, periods of the year, etc.), and failure metrics regarding failed attempts to access the client website (e.g., average failure rate that is determined by dividing a total number of failure events over a total number of events to determine a failed transaction percentage). Each metric determined by the controller 200 can have a settable or tunable threshold (e.g., settable by a user input received by the workstation 150). As a result, sensitivity of the controller 200's anomaly detection for each client key can be adjusted. Each time a value for one of the metrics of a certain time period reaches the threshold, an overall anomaly level (e.g., for the certain time period, such as an hour of web traffic data) may increase. The controller 200 may store the client key metrics, anomaly level, etc., in the traffic volume summary table explained above with respect to STEP 415 of FIG. 4.

At STEP 515, the controller 200 may calculate a z-score metric or a set of z-score metrics that represent how anomalous web traffic data within a certain time period (e.g., a time span such as an hour during a certain day) is compared to other web traffic data (e.g., web traffic data of the same time of previous days, web traffic data of numerous time periods preceding or following the certain time period, or the like). In some embodiments, the controller 200 calculates a standard z-score, which is calculated by dividing a data point's difference from the mean of a dataset by the standard deviation of the data set (i.e., the number of standard deviations from the data set mean to a data point). For example, when a count/value of the certain time period has a z-score of 0.0, it may indicate that the count/value is identical to a mean count/value of a data set that includes a plurality of time periods. As another example, when a count/value of the certain time period has a z-score of 1.0, it may indicate that the count/value is one standard deviation from the mean count/value of the data set that includes a plurality of time periods. In some embodiments, z-scores may be positive or negative, with a positive value indicating that the count/value is above the mean count/value of the data set and a negative score indicating the count/value is below the mean count/value of the data set. In other embodiments, the controller 200 calculates a modified z-score, which is a determination of how many standard deviations a data point is from the median of a data set. Z-score triggers that can be used by the controller 200 to detect an anomaly in a certain time period include the following z-score target metrics (i.e., volume metrics):

Score_Count: Volume of scores during the hour

Green_Score_Count: Number of scores marked green (e.g., low risk status)

Yellow_Score_Count: Number of scores marked yellow (e.g., warning status)

Red_Score_Count: Number of scores marked red (e.g., anomaly status)

Failure Count: Number of failed events

Action Count: Number of overall events

In some embodiments and in accordance with previous explanation herein, scores of individual events/transactions being marked green, yellow, or red and/or a determination whether an individual event/transaction has failed is determined by another device and/or algorithm that provides theses scores and/or determinations to the server 140 to be used as inputs to the methods described herein. Thus, in some embodiments, the specific method(s) used by the another device and/or algorithm that analyzes each event/transaction individually is not relevant to the process 500.

To calculate the modified z-score, the controller 200 may compare all data for a selected time period (e.g., one hour) against other available data for the same hour (e.g., the same hour of a different day) or against other available data for other hours of the same day. For example, a standard deviation of web traffic data counts/values from between 1:00 PM and 2:00 PM on a certain day may be determined using counts/values of a data set that includes other web traffic data from each of the other 23 hours of the certain day. As another example, a standard deviation of web traffic data counts/values from between 1:00 PM and 2:00 PM on a certain day may be determined using counts/values of a data set that includes other web traffic data from between 1:00 PM and 2:00 PM on ten other days preceding or following the certain day. These example z-score determinations may indicate how anomalous the web traffic data from between 1:00 PM and 2:00 PM on the certain day is compared to other web traffic data (i.e., a larger data set of web traffic data). In some embodiments, the controller 200 treats weekday web traffic and weekend web traffic differently. For each of the z-score target metrics, the controller 200 may analyze all of the time period's data and determines the modified z-score. The modified z-score may be calculated over a sliding window corresponding to a period size (e.g., a sliding window that is one hour long with a period size that is 24 hours long as indicated in the first example above). If the period size is not specified, the z-score may be calculated over the entire data set (e.g., a period size longer than the 24 hour period size of the above first example but limited by the amount of web traffic data received by the server 140). The modified z-score may be calculated from a mean absolute deviation ("MeanAD") or median absolute deviation ("MAD"). These values may be multiplied by a constant to approximate the standard deviation. Depending on the value of MAD, the modified z-score can be calculated in different ways. For example, if MAD equals zero, the modified z-score is calculated as shown below in EQN. 1:

$$(X-\text{median})/1.25 \times \text{MeanAD} \qquad \text{EQN. 1}$$

where X is a value associated with a data point, median is the median of the analyzed data set, and the product of MeanAD and the constant, 1.25, approximately equals the standard deviation.

If MAD does not equal zero, the modified z-score may be calculated as shown below in EQN. 2:

$$(X-\text{median})/1.49 \times \text{MAD} \qquad \text{EQN. 2}$$

where X is the value associated with the data point, median is the median of the analyzed data set, and the product of MAD and the constant, 1.49, approximately equals the standard deviation.

The controller 200 implementing such a statistical approach to detecting anomalous traffic may rely on data invariants (e.g., mean, MeanAD, and MAD) to estimate a degree of anomalousness for each data point or record of a time period, and each value for each data point may be treated separately. The value for each data point may be mean-adjusted or median-adjusted to align the magnitude of the data point's value to the value's population variance. In some embodiments, MAD is used rather than standard deviation ("STD") because MAD is more accurate in sample measurements and less volatile than STD. MAD is also a natural weight while STD uses an observation itself as its own weight, which can result in overweighting. Thus, the controller 200 can calculate anomalousness using a natural measure (e.g., population sample deviation approximated using MAD).

In some embodiments, a statistical approach other than modified z-score can be used by the controller 200 to detect anomalous web traffic in a certain time period. For example, an Isolation Forest model can be used where a random forest algorithm is applied to data to identify how many cuts or branches are required before a sample can be uniquely identified. A more anomalous sample requires fewer cuts to be identified uniquely. For example, when analyzing a plurality of columns of data where each column represents a different attribute and each row includes a value for the attribute for a given event/attempted transaction, columns that include rows with more unique values (i.e., values that are mostly different than each other) may allow for anomalous events to be more quickly uniquely identified than columns that include rows with less unique values (i.e., values that include many of the same values). Specifically, if many values are the same for a certain attribute, additional attribute values will be necessary to uniquely identify an anomalous event. For example, an attribute column of IP addresses is likely to have more unique values than an attribute column that indicates whether or not a javascript widget properly loaded on a webpage during an attempted transaction. The controller 200 implementing such a statistical approach may allow for more focused and effective model tuning (e.g., compared to a rules-based approach). A rules-based approach to anomaly detection can require significant processing overhead, but a statistical approach may require far fewer computational resources. By reducing the computational resources required by the controller 200, anomaly detection can be completed more quickly and efficiently than a more computationally heavy implementation. A statistical approach may also require fewer resources related to updating rules, optimizing outputs, and user training. In some embodiments, the statistical approach implemented by the controller 200 includes a learning routine or process for tuning (e.g., using backpropagation). In some embodiments, the controller 200 periodically samples mean values to compensate for data variance.

Following STEP 515, the controller 200 may calculate change rate metrics (STEP 520). Change rate metrics may include a change rate and a change direction for the z-score target metrics described above. For example, the change rate metrics may also represent how anomalous web traffic data within a certain time period (e.g., a time span such as an hour during a certain day) is compared to (i) other times of that same day (i.e., how the frequency of anomalies in the web traffic changed over the course of time periods before or after the currently-analyzed time period throughout a day being analyzed). In some embodiments, the change rate metrics indicate a change in raw values of the z-score target metrics from one time period to another time period as opposed to a standard deviation in values from one time period when compared to a plurality of other time periods as is determined as the z-score at STEP 515. For example, the change rate metrics may indicate a change in raw values of the z-score target metrics over sequential time periods in the same day, over the same time periods in sequential days, and/or the like. For example, anomaly counts/values (e.g., z-score target metrics as determined by a separate system) from a first time period (e.g., between 1:00 PM and 2:00 PM on a certain day) may be compared to counts/values from web traffic data from another time period (e.g., between 12:00 PM and 1:00 PM on the certain day, between 2:00 PM and 3:00 PM on the certain day, between 1:00 PM and 2:00 PM on a day before the certain day, or the like). In some embodiments, the "another time period" used to determine the change rate metrics is included in the plurality of other time periods that are used to determine the z-score metric(s) (as explained at block 515 above). In other embodiments, the "another time period" used to determine the change rate metrics is not included in the plurality of other time periods that are used to determine the z-score metric(s). In some embodiments, for the server 140 to use the web traffic data from a given time period in its determination of change rate metrics (or other metrics explained herein), there may be a low volume threshold with respect to the number of overall events that occurred in the time period. For example, when the low volume threshold is two hundred events per hour, any hour in which less than two hundred events/attempted transactions occur will not be used to calculate the change rate metrics because such a low number of events may not be accurate when attempting to identify anomalies. Additionally or alternatively, each of the above z-score target metrics may include a separate low volume threshold to ensure that enough data has been gathered with respect to the z-score target metric to make the data reliable. For example, a certain amount of failed events or scores marked red (or another target metric) must be present in order to calculate a reliable change rate metric with respect to the failed events or scores marked red (or another target metric). The value(s) of the low-volume threshold(s) may be configurable by the controller 200 and can be set as desired for a particular application. In some embodiments, the low-volume threshold(s) prevent web traffic data from a time period from falsely being identified as anomalous due to the time period not including enough web traffic data to provide a representative and accurate sample size.

After the change rate metrics are calculated, the controller 200 may calculate failure metrics for the client web traffic for the certain time period (STEP 525). In some embodiments, the failure metrics indicate a rate of failure that is determined by dividing a total number of failed events (i.e., denied transactions) by a total number of events/attempted transactions within the certain time period. In other words, the rate of failure may be a failed transaction percentage within the certain time period. In some embodiments, the failure metrics may indicate a raw number of failed events (i.e., denied transactions) within the certain time period.

After the metrics have been calculated for the time period's web traffic data at STEPS 515-525, the controller 200 may use the metrics to detect client traffic anomalies (STEP 530). For each calculation step, anomaly score levels can be assigned and/or updated. For example, a modified z-score above a z-score threshold value can increase an anomaly score level for the certain time period. Similarly, a change rate above a change rate threshold value can increase an anomaly score level for the certain time period, and a calculated failure rate greater than a failure rate threshold can increase an anomaly score level for the certain time period. The controller 200 can update the configuration tables with the anomaly metrics and anomaly scores. In some embodiments, the controller 200 stores the anomaly metrics in both hourly and daily buckets and assigns an anomaly score for each bucket. The anomaly score levels (e.g., hourly, daily, etc.) for each metric can be mapped to a severity level or anomaly level. The controller 200 may be configured to update the configuration tables based on the determined anomaly levels (e.g., hourly, daily, etc.) and configured to update the database 145. In other words, although STEPS 515-525 were explained above with respect to determining z-score metrics, change rate metrics, and failure metrics with respect to a certain time period such as one hour, the server 140 may repeat STEPS 515-525 with respect to many different time periods (e.g., for each hour in a day, for each day) to identify anomalous time periods (e.g., an anomalous hour in a single day, an anomalous hour at the same across multiple days, an anomalous day, etc.).

After the controller 200 completes the anomaly detection of FIG. 5 to identify an anomalous time period in the past (e.g., at STEP 425 of FIG. 4), the controller 200 may be configured to use the anomaly detection results (e.g., the determined anomaly levels and the attributes associated with the web traffic data that was used to determine the anomaly levels) to determine one or more attack signatures related to the client web traffic anomalies (i.e., execute the process 600 of FIG. 6, for example, at STEP 430 of FIG. 4). An attack signature is a set of traffic characteristics that can be used to differentiate an attack or an anomaly from normal client website activity. In other words, an attack signature identifies or describes attributes of web traffic data that were common between numerous events that occurred during a determined anomalous time period and that were determined to be anomalous. For example, a number of anomalous events/attempted transactions may have originated from the same combination of type of web browser, type of mobile device, and Internet Protocol (IP) address. Accordingly, this combination of type of web browser, type of mobile device, and IP address may be identified as an attack signature from which an attempted cyber attack originated. Example attack signatures are provided below:

[User Agent_*A*]+[Firefox]+[123.5.2.10]

or

[User Agent_*B*]+[Mobile_Device]

Once an attack signature has been identified, the attack signature may be programmed into the server 140 (e.g., by an analyst using the workstation 150) to further refine one or more anomaly detection algorithms, thereby improving future detection of cyber-attacks aimed at the client website.

To determine an attack signature related to anomalous web traffic, the controller 200 may execute the process 600 of FIG. 6 (e.g., during STEP 425 of FIG. 4). The controller 200 may begin by loading client web traffic data (STEP 605). In some embodiments, the controller 200 re-loads the client web traffic data following execution of the process 500. In other embodiments, the client web traffic data was previously loaded and remains available to the controller 200 following anomaly detection. The controller 200 may then determine whether an anomaly level for the web traffic data is greater than a threshold value (STEP 610). In some embodiments, for any 24-hour period with at least one hour within it having an anomaly level greater than an overall anomaly threshold value, the controller 200 considers that 24-hour period to have a reportable anomaly. If no anomaly levels are greater than the threshold value, the process 600 may return to STEP 605. If at least one anomaly level is greater than the threshold value, the controller 200 may be configured to determine or attempt to determine an attack signature related to the anomalous web traffic data.

To do so, the controller 200 may evaluate web traffic data with certain attribute combinations (i.e., different attributes with various attribute values) (STEP 615). In some embodiments, the attribute combinations initially include low-cardinality attributes (i.e., attributes that have a small number of distinct possible values). For example, such low-cardinality attributes include: (1) inputstatus; (2) jskeystatus; and (3) cookiestatus because each of these attributes includes only two possible values: valid/present or invalid/missing. These low-cardinality attributes may be contrasted with higher cardinality attributes such as IP address, device ID, etc. that may have a much larger number of distinct possible values. By initially evaluating web traffic data with attribute combinations that include low cardinality attributes, the web traffic data is broken into larger groups than if higher cardinality attributes were used to define the attribute combinations. As explained in greater detail below, this initial evaluation of web traffic data with attribute combinations that include low cardinality attributes reduces an amount of web traffic data to be processed to determine an attack signature, which decreases processing time and increases processing efficiency of the server 140. In some embodiments, the "inputstatus" attribute is based on information provided from a webpage that indicates whether the webpage is well-formed. In some embodiments, the "jskeystatus" attribute is a javascript widget loading status that indicates whether a javascript widget was loaded by the webpage. In some embodiments, the "cookiestatus" attribute indicates whether the user is verified/valid or unverified/invalid/new. As explained above, the possible distinct values for each of these attributes is small, and each possible combination of these values for a combination of these three attributes may be evaluated. For example, six possible attribute combinations exist for the combination of the three example low cardinality attributes explained above. For any combination of attribute values that has a fail count greater than or equal to a user configurable fail count threshold value for the evaluated time period, the combination of attribute values is retained. For any combination of attribute values that has a fail count less than the fail count threshold value, the combination of attribute values is discarded. For example, below are two of the six combinations of attribute values that are evaluated for the time period:

[inputstatus=Valid]+[jskeystatus=Missing]+
    [cookiestatus=Valid]

[inputstatus=Missing]+[jskeystatus=Missing]+
    [cookiestatus=Invalid]

The server 140 may determine that the first above example combination of attribute values has a fail count of 300. The server 140 may determine that the second above example combination of attribute values has a fail count of 1000. If the configurable fail count threshold value is set to 500, the first combination of attribute values is discarded (i.e., not further analyzed) and the second combination of attribute values is retained. The controller 200 analyzes each combination of the selected attribute values (e.g., each of the six combinations of attribute values based on the three example attributes explained above) to find all combinations of selected attribute values that have fail counts greater than or equal to the fail count threshold value. Each combination of attribute values that produces a fail count greater than or equal to the fail count threshold value is added to an attribute key (e.g., a compound attribute key) created by the controller 200 (STEP 620). The attribute key(s) may be used to further analyze a portion of the web traffic data as explained below with respect to STEPS 625-635. Each combination of attribute values that produces a fail count less than the fail count threshold is not added to an attribute key and is, therefore, not used to further analyze the web traffic data.

After the attribute key(s) is created at STEP 620, the controller 200 may divide a number of available traffic characteristics from the web traffic data into configurable groups (STEP 625). The characteristic groups may correspond to groups of potential characteristics to be included in an attack signature. In some embodiments, at least one of the traffic characteristics include attributes with higher cardinality than each of the low-cardinality attributes selected to form the attribute combinations at STEP 615. In other words, the attributes selected as traffic characteristics may have a larger number of distinct possible values than the attributes selected to form the attribute combinations at STEP 615. Example characteristic groups are provided below:

Group 1: [Browser]+[Number of Clicks]+[Device ID (cookie)]
Group 2: [User Agent]+[E-Input Signature]
Group 3: [User Agent]+[Browser]

The controller 200 may identify one or more attack signatures by interrogating the traffic characteristic groups with attribute values corresponding to those include in the attribute key(s) created at STEP 620 (STEP 630). By using the attribute key(s) that were determined based on only the low-cardinality attribute combinations that produced a fail count greater than or equal to the fail count threshold, the controller 200 reduces an amount of web traffic data that is being analyzed (i.e., not all web traffic data is analyzed at STEP 630). For example, the attribute combinations that produced a fail count less than the fail count threshold are not used to interrogate the traffic characteristic groups. Accordingly, the web traffic data corresponding to the low fail count attribute combinations is not analyzed because it is unlikely that a cyber-attack is associated with such data with a low fail count. Thus, the initial evaluation of web traffic data with attribute combinations that include low cardinality attributes (at STEP 615) reduces an amount of web traffic to be processed to determine an attack signature (at STEPS 630 and 635), which decreases processing time and increases processing efficiency of the server 140.

Continuing the explanation of STEP 630, in some embodiments, the controller 200 is configured to scan each column of web traffic data within a traffic characteristic group individually to determine what values within the column are considered to be anomalous. The anomalous values are those having a high fail ratio within the time period for the specific attribute key. When determining which traffic characteristics to include in potential attack signatures, the controller 200 may be configured to determine a cost of adding another traffic characteristic (i.e., another column of web traffic data) to the attack signature. In other words, the controller 200 may determine a cost of filtering the web traffic data based on the anomalous values identified in a particular column of web traffic data. For example, the filtering cost is determined by calculating a difference between the number of SUCCESS events and the number of FAIL events for the particular column. In some embodiments, a column that has a cost greater than zero (i.e., more SUCCESS events than FAIL events) can be skipped by the controller 200. The controller 200 is then configured to scan each column within a group in order of determined cost. If the cost of adding anomalous values to the attack signature is greater than or equal to an existing cost (i.e., a larger difference between SUCCESS events and FAIL events), the column can be skipped by the controller 200. If the cost of adding anomalous values to the attack signature is less than the existing cost, the controller 200 is configured to include the column in the attack signature. In some embodiments, this process 600 enables dynamic column ordering (e.g., based on cost). Dynamic column ordering improves processing efficiency of the controller 200 by only adding columns/traffic characteristics to the attack signature that further improve the identification of a potential attack associated with failed events. In other words, columns/traffic characteristics that do not further refine the attack signature because they include mostly redundant data with another column/traffic characteristic (e.g., touch count and words per minute) are not both used as part of the attack signature. Rather, only the one of these two column/traffic characteristics that further improves the identification of the potential attack associated with failed events is included in the attack signature. As the controller 200 finds additional filters/refinements of the web traffic data, the controller 200 is configured to remove web traffic data that is covered by the attack signature. As a result, controller 200 is configured to focus on a smaller and smaller data set until no further refinements to the attack signature are identified. Such a dynamic reduction in the analyzed data set also increases the speed and efficiency of attack signature determination by the controller 200.

After the controller 200 has identified all desired filters/refinements for a particular set of web traffic data, the controller 200 is configured to combine the filters/refinements into an attack signature (STEP 635). The controller 200 is then configured to update the attribute key to include the attack signature (STEP 640). In other words, the controller 200 combines the attribute values already included in the attribute key(s) from STEPS 615 and 620 with the attribute values identified as part of the attack signature at STEPS 625-635. In some embodiments, a cost function is used to determine if a particular combination of already included attribute values and attribute values from the attack signature, when added to the attribute key, improves the overall accuracy of anomaly detection. The cost function attempts to minimize the number of SUCCESS events versus the number of FAIL events (i.e., attempt to ensure that the combination of attribute values included in the attribute key(s) defines as many FAIL events as possible and as few SUCCESS events as possible). If the particular combination of previously-identified attribute values from STEPS 615 and 620 and the attribute values from the attack signature does not improve the overall accuracy of anomaly detection, the controller 200 can discard the attack signature and not add it to the attribute key. In some embodiments, the controller 200 is configured to add anomalous column values and attack signatures to the configuration tables (e.g., the daily fraud report summary table) and update the database 145. In some embodiments, the processes 400, 500, and 600 are implemented in the controller 200 using custom SQL, which increases a range of derived data points for anomaly detection by combining existing database columns with regular expressions.

After the controller 200 finishes detecting anomalies (FIG. 5), determining attack signatures (FIG. 6), and updating the database 145, the controller 200 is configured to generate and output a report of the anomalies and attack signatures. For example, the controller 200 is configured to determine aggregate figures for the time period. The aggregate figures may include the number of devices used in the attack, the number of IP addresses used in the attack, the number of countries from which the attack originated, the number of accounts affected by the attack, a capture rate for the attack, a failure rate for the attack, an interdiction rate (e.g., using CAPTCHAs), etc. In some embodiment, such reports are generated on a daily basis. In some embodiments, the reports may be used by an analyst to re-program an anomaly or cyber-attack detection algorithm to more accurately detect future anomalies or cyber-attacks.

Thus, embodiments described herein provide, among other things, systems, methods, an computer readable media related to the detection of anomalies in web traffic. Various features and advantages are set forth in the following claims.

What is claimed is:

1. An anomaly detection system comprising:
a database; and
a server connected to the database, the server configured to identify anomalous web traffic of a client key from a first time period, the server including a processing unit and a memory, the server configured to:

receive the web traffic data from the database, calculate, using the processing unit, a z-score metric for the client key, wherein the z-score metric indicates a deviation of at least one value of a first attribute of the client key with respect to other values of the first attribute (i) of the client key from other time periods or (ii) of other client keys, calculate, using the processing unit, a change rate metric for the client key based on the at least one value of the first attribute from the first time period compared to another value of the first attribute of the client key from another time period, calculate, using the processing unit, a failure metric for the client key, and determine that the first time period is an anomalous time period based on the z-score metric, the change rate metric, and the failure metric.

2. The anomaly detection system of claim 1, wherein the change rate metric indicates a rate of change in the value of the first attribute of the client key during the first time period with respect to other values of the first attribute from a previous period of time.

3. The anomaly detection system of claim 1, wherein the failure metric indicates a failure rate based on a number of failed attempts to access a client website during the first time period.

4. The anomaly detection system of claim 1, wherein, in response to determining that the first time period is an anomalous time period, the server is further configured to:

evaluate the web traffic data using a plurality of attribute combinations, wherein each attribute combination includes a plurality of attributes each with a corresponding value, and wherein each attribute combination includes a unique combination of values when compared to the other attribute combinations of the plurality of attribute combinations;

determine that the web traffic data corresponding to at least one of the plurality of attribute combinations includes a fail count greater than or equal to a fail count threshold;

create an attribute key including the values of the at least one of the plurality of attribute combinations; and identify an attack signature using the attribute key.

5. The anomaly detection system of claim 4, wherein the server is configured to identify the attack signature by:

establishing a plurality of groups of traffic characteristics included in the web traffic data, wherein each group of traffic characteristics includes a plurality of traffic characteristics included in the web traffic data;

interrogating the web traffic data in the groups of traffic characteristics using attribute values of the attribute key to determine which values in the groups of traffic characteristics correspond to the attribute values of the attribute key; and in response to determining that a value in the groups of traffic characteristics corresponds to the attribute values of the attribute key, add the value of the traffic characteristic to the attack signature.

6. The anomaly detection system of claim 5, wherein the server is configured to add the value of the traffic characteristic to the attack signature in response to determining that a cost of adding the value of the traffic characteristic to the attack signature is less than a cost threshold;

wherein the cost indicates whether adding the value of the traffic characteristic to the attack signature will further improve an identification of a potential attack associated with failed events included the web traffic data.

7. The anomaly detection system of claim 5, wherein each of the plurality of attributes included in the plurality of attribute combinations have a lower cardinality than at least one of the plurality of traffic characteristics included in the plurality of groups of traffic characteristics.

8. The anomaly detection system of claim 4, wherein the server is configured to generate and output a report of the anomalous time period and the attack signature.

9. A method of detecting an anomaly in web traffic data, the method comprising:

receiving, with a server and from a database, the web traffic data of a client key from a first time period;

calculating, using the processing unit of the server, a z-score metric for the client key, wherein the z-score metric indicates a deviation of at least one value of a first attribute of the client key with respect to other values of the first attribute (i) of the client key from other time periods or (ii) of other client keys;

calculating, using the processing unit, a change rate metric for the client key based on the at least one value of the first attribute from the first time period compared to another value of the first attribute of the client key from another time period;

calculating, using the processing unit, a failure metric for the client key; and determining, using the processing unit, that the first time period is an anomalous time period based on the z-score metric, the change rate metric, and the failure metric.

10. The method of claim 9, wherein the change rate metric indicates a rate of change in the value of the first attribute of the client key during the first time period with respect to other values of the first attribute from a previous period of time.

11. The method of claim 9, wherein the failure metric indicates a failure rate based on a number of failed attempts to access a client website during the first time period.

12. The method of claim 9, further comprising, in response to determining that the first time period is an anomalous time period:

evaluating, using the processing unit, the web traffic data using a plurality of attribute combinations, wherein each attribute combination includes a plurality of attributes each with a corresponding value, and wherein each attribute combination includes a unique combination of values when compared to the other attribute combinations of the plurality of attribute combinations;

determining, using the processing unit, that the web traffic data corresponding to at least one of the plurality of attribute combinations includes a fail count greater than or equal to a fail count threshold;

creating, using the processing unit, an attribute key including the values of the at least one of the plurality of attribute combinations; and identifying, using the processing unit, an attack signature using the attribute key.

13. The method of claim 12, wherein identifying the attack signature includes:

establishing, using the processing unit, a plurality of groups of traffic characteristics included in the web traffic data, wherein each group of traffic characteristics includes a plurality of traffic characteristics included in the web traffic data;

interrogating, using the processing unit, the web traffic data in the groups of traffic characteristics using attribute values of the attribute key to determine which values in the groups of traffic characteristics correspond to the attribute values of the attribute key; and in response to determining that a value in the groups of traffic characteristics corresponds to the attribute values of the attribute key, adding, using the processing unit, the value of the traffic characteristic to the attack signature.

14. The method of claim 13, wherein adding the value of the traffic characteristic to the attack signature includes adding the value of the traffic characteristic to the attack signature in response to determining that a cost of adding the value of the traffic characteristic to the attack signature is less than a cost threshold;

wherein the cost indicates whether adding the value of the traffic characteristic to the attack signature will further improve an identification of a potential attack associated with failed events included the web traffic data.

15. The method of claim 13, wherein each of the plurality of attributes included in the plurality of attribute combinations have a lower cardinality than at least one of the plurality of traffic characteristics included in the plurality of groups of traffic characteristics.

16. The method of claim 12, further comprising generating and outputting, with the server, a report of the anomalous time period and the attack signature.

17. An anomaly detection system comprising:
a database configured to store web traffic data; and
a server connected to the database, the server including a processing unit and a memory, the server configured to:
receive the web traffic data from the database,
evaluate the web traffic data using a plurality of attribute combinations, wherein each attribute combination includes a plurality of attributes each with a corresponding value, and wherein each attribute combination includes a unique combination of values when compared to the other attribute combinations of the plurality of attribute combinations;

determine that the web traffic data corresponding to at least one of the plurality of attribute combinations includes a fail count greater than or equal to a fail count threshold;
create an attribute key including the values of the at least one of the plurality of attribute combinations; and
identify an attack signature using the attribute key.

18. The anomaly detection system of claim 17, wherein the server is configured to identify the attack signature by:
establishing a plurality of groups of traffic characteristics included in the web traffic data, wherein each group of traffic characteristics includes a plurality of traffic characteristics included in the web traffic data;
interrogating the web traffic data in the groups of traffic characteristics using attribute values of the attribute key to determine which values in the groups of traffic characteristics correspond to the attribute values of the attribute key; and
in response to determining that a value in the groups of traffic characteristics corresponds to the attribute values of the attribute key, add the value of the traffic characteristic to the attack signature.

19. The anomaly detection system of claim 18, wherein the server is configured to add the value of the traffic characteristic to the attack signature in response to determining that a cost of adding the value of the traffic characteristic to the attack signature is less than a cost threshold;
wherein the cost indicates whether adding the value of the traffic characteristic to the attack signature will further improve an identification of a potential attack associated with failed events included the web traffic data.

20. The anomaly detection system of claim 18, wherein each of the plurality of attributes included in the plurality of attribute combinations have a lower cardinality than at least of the plurality of traffic characteristics included in the plurality of groups of traffic characteristics.

* * * * *